(12) United States Patent
Guerra et al.

(10) Patent No.: US 11,367,079 B2
(45) Date of Patent: Jun. 21, 2022

(54) COMPLIMENTARY CUSTOMER RELATIONSHIP MANAGEMENT (CRM) MOBILE INTEGRATION

(71) Applicant: SugarCRM Inc., Cupertino, CA (US)

(72) Inventors: Filipe Guerra, San Jose, CA (US); Vladyslav Kulchytskyy, Nashua, NH (US)

(73) Assignee: SugarCRM, Inc., Cupertino, CA (US)

( * ) Notice: Subject to any disclaimer, the term of this patent is extended or adjusted under 35 U.S.C. 154(b) by 204 days.

(21) Appl. No.: 15/230,464

(22) Filed: Aug. 7, 2016

(65) Prior Publication Data
US 2018/0039992 A1    Feb. 8, 2018

(51) Int. Cl.
*G06Q 30/00* (2012.01)
*G06Q 10/10* (2012.01)

(52) U.S. Cl.
CPC ............ *G06Q 30/01* (2013.01); *G06Q 10/10* (2013.01)

(58) Field of Classification Search
None
See application file for complete search history.

(56) References Cited

U.S. PATENT DOCUMENTS

| | | | | |
|---|---|---|---|---|
| 2007/0179841 A1* | 8/2007 | Agassi | ............... | G06Q 30/0255 705/14.66 |
| 2009/0016507 A1* | 1/2009 | Altberg | ................. | G06Q 30/02 379/114.01 |
| 2009/0210148 A1* | 8/2009 | Jayanthi | ................ | G01C 21/26 701/467 |
| 2011/0078236 A1* | 3/2011 | Olsen, Jr. | .............. | H04L 63/104 709/203 |
| 2012/0231769 A1* | 9/2012 | Sakissian | ................ | H04W 4/16 455/414.1 |

(Continued)

FOREIGN PATENT DOCUMENTS

WO    WO2008070605 A1 *  6/2008    ............. G06F 3/048

OTHER PUBLICATIONS

IBM global dictionary, "Terminology—I", https://web.archive.org/web/20111003170045/http://www-01.ibm.com/software/globalization/terminology/I.html (2011) (Year: 2011).*

(Continued)

*Primary Examiner* — Paul R Fisher
(74) *Attorney, Agent, or Firm* — CRGO Global; Steven M. Greenberg

(57) ABSTRACT

Embodiments of the present invention provide method, system and computer program product for complimentary CRM mobile integration. In an embodiment of the invention, a method for CRM mobile integration includes initially identifying an end user who simultaneously accesses both a CRM application executing in memory of a host computing platform, and also a CRM application agent executing in memory of a mobile computing device that is separate from the host computing platform. The method also includes, thereafter, detecting a request by the end user to access data in the CRM application. Finally, the method includes responding to the detection of the request by selecting an action for the mobile device in a table corresponding to a type of the data in the CRM application, and directing the CRM application in the mobile device to prompt the end user to complete the selected action for the data of the request.

9 Claims, 2 Drawing Sheets

(56) References Cited

U.S. PATENT DOCUMENTS

2013/0217361 A1\* 8/2013 Mohammed .......... H04M 15/77
    455/411
2015/0117631 A1\* 4/2015 Tuchman ............ H04M 3/5233
    379/265.09

OTHER PUBLICATIONS

"Avantgo: Avantgo Ships Second Generation of Avantgo Mobile Sales; New Solution Drives Adoption of CRM/SFA Systems with Out-of-the-Box Siebel and Web Integration." M2 Presswire, Feb. 3, 2003, p. 1. (Year: 2003).\*

\* cited by examiner

COMPLIMENTARY CUSTOMER RELATIONSHIP MANAGEMENT (CRM) MOBILE INTEGRATION

BACKGROUND OF THE INVENTION

Field of the Invention

The present invention relates to customer relationship management (CRM) and more particularly to integrating CRM data with a mobile computing device.

Description of the Related Art

CRM refers to the interaction that a business entity enjoys with its customers, whether the business entity provides sales or services to the customer. CRM is often thought of as a business strategy that enables business managers to understand the customer, to retain customers through better customer experience, to attract new customers, increase profitability and to decrease customer management costs. In real terms, however, CRM systems are used specifically to manage business contacts, clients, contract wins and sales leads. As such, CRM solutions provide the end user with the customer business data necessary to provide services or products desired by the customers, to provide better customer service, to cross-sell and to up-sell more effectively, to close deals, retain current customers and understand the identity of the customer.

CRM systems are often used to manage the entire lifecycle of a relationship between a customer and an organization. In this regard, a CRM system is enabled to manage tasks for organizational representatives associated with the targeting and acquisition of a new customer, the fulfillment of a sale to a new customer or an existing customer, and the maintenance of a relationship with an existing customer. Much of the role of the CRM system is to store data documenting the relationship between representatives of an organization and its customers and prospective customers.

Part and parcel of CRM is a mobile sales force. That is to say, in recent years, advancements in mobile technology permit a new model of work habit that no longer confines the sales representative or customer service representative to a fixed desk. Instead, the workforce has become mobile, moving about both within a workplace facility and outside the workplace facility in the field. The advent and present ubiquity of the smartphone in particular, not only permits voice communications with customers and colleagues from almost anywhere in the world, but also permits remote accessibility to critical applications including CRM. Indeed, modern purveyors of CRM systems almost always provide some sort of mobile accessibility to the CRM system.

BRIEF SUMMARY OF THE INVENTION

Embodiments of the present invention address deficiencies of the art in respect to mobile utilization of a CRM system and provide a novel and non-obvious method, system and computer program product for complimentary CRM mobile integration. In an embodiment of the invention, a method for CRM mobile integration includes initially identifying an end user who simultaneously accesses both a CRM application executing in memory of a host computing platform, and also a CRM application agent executing in memory of a mobile computing device that is separate from the host computing platform. The method also includes, thereafter, detecting a request by the end user to access data in the CRM application. Finally, the method includes responding to the detection of the request by selecting an action for the mobile device in a table corresponding to a type of the data in the CRM application, and directing the CRM application in the mobile device to prompt the end user to complete the selected action for the data of the request.

In one aspect of the embodiment, the action selected in the table is the initiating of the dialing of a phone number for a contact associated with the data by a phone dialer application executing in the mobile device. In another aspect of the embodiment, the action selected in the table is the initiating of the navigation to an address of a contact associated with the data in a navigation application executing in the mobile device. In yet another aspect of the embodiment, the action selected in the table is the initiating of a retrieval of social media postings for a contact associated with the data in a social media application executing in the mobile device.

In another embodiment of the invention, a CRM data processing system is configured for complimentary CRM mobile integration. The system includes a host computing platform with one or more computers, each with memory and at least one processor. The system also includes a CRM application executing in the memory of the host computing platform. Finally, the system includes a complimentary CRM mobile integration module coupled to the CRM application. The module includes program code enabled upon execution in the host computing platform to identify an end user simultaneously accessing both the CRM application and also a CRM application agent executing in memory of a mobile computing device communicatively coupled to the host computing platform over a computer communications network, to detect a request by the end user to access data in the CRM application and to respond to the detection of the request by selecting an action for the mobile device in a table corresponding to a type of the data in the CRM application, and directing the CRM application in the mobile device to prompt the end user to complete the selected action for the data of the request.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for complimentary CRM mobile integration. In accordance with an embodiment of the invention, an end user of a CRM system is registered as an active user of a CRM system executing in memory of a host computing platform. As well, the end user is registered as an active user of a CRM mobile agent on a mobile computing device that is separate from the host computing platform. A request by the end user to access data in the CRM system is detected. In response to the detection of the request a table is consulted mapping the data subject to the request with an action in the mobile device, such as dialing a phone number for a contact associated with the data, or texting a message to a contact associated with the data. Finally, a prompt is displayed to the end user recommending the mapped action.

Figure 1:
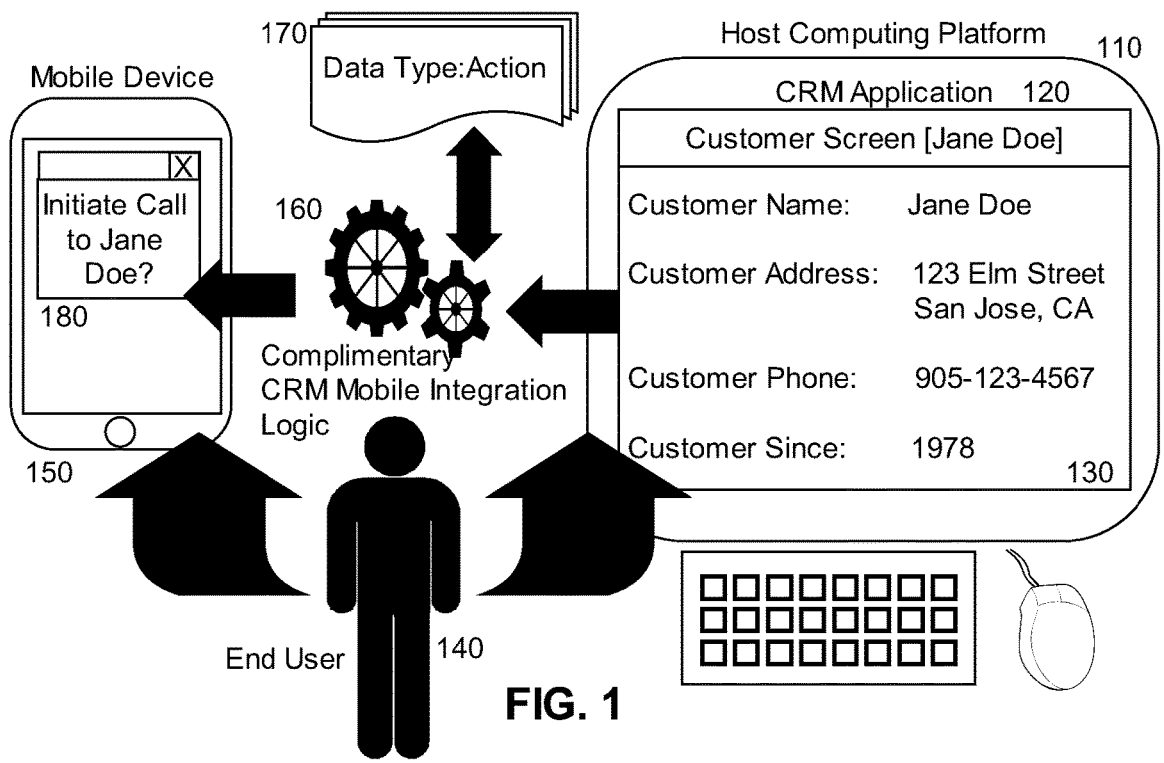
FIG. 1 is a pictorial illustration of a process for complimentary CRM mobile integration.

In further illustration, FIG. 1 is a pictorial illustration of a process for complimentary CRM mobile integration. As shown in FIG. 1, an end user 140 simultaneously utilizes a CRM application 120 executing in a host computing platform 110, and also a mobile device 150. The end user 140 issues a request in the CRM application 120 to retrieve CRM data 130, for instance a contact record in the CRM application 120. Complimentary CRM mobile integration logic 160 detects the request to retrieved the CRM data 130 and maps the type of data requested in a table 170 to an action able to be performed in the mobile device 150, such as invoking a dialer to dial a phone number of the contact, invoking a messaging application to message the contact, invoking the navigation application to navigate to the contact, or invoking a social media application to retrieve posting by the contact. Thereafter, a prompt 180 is displayed in the mobile device 150 request permission to perform the mapped action.

Figure 2:
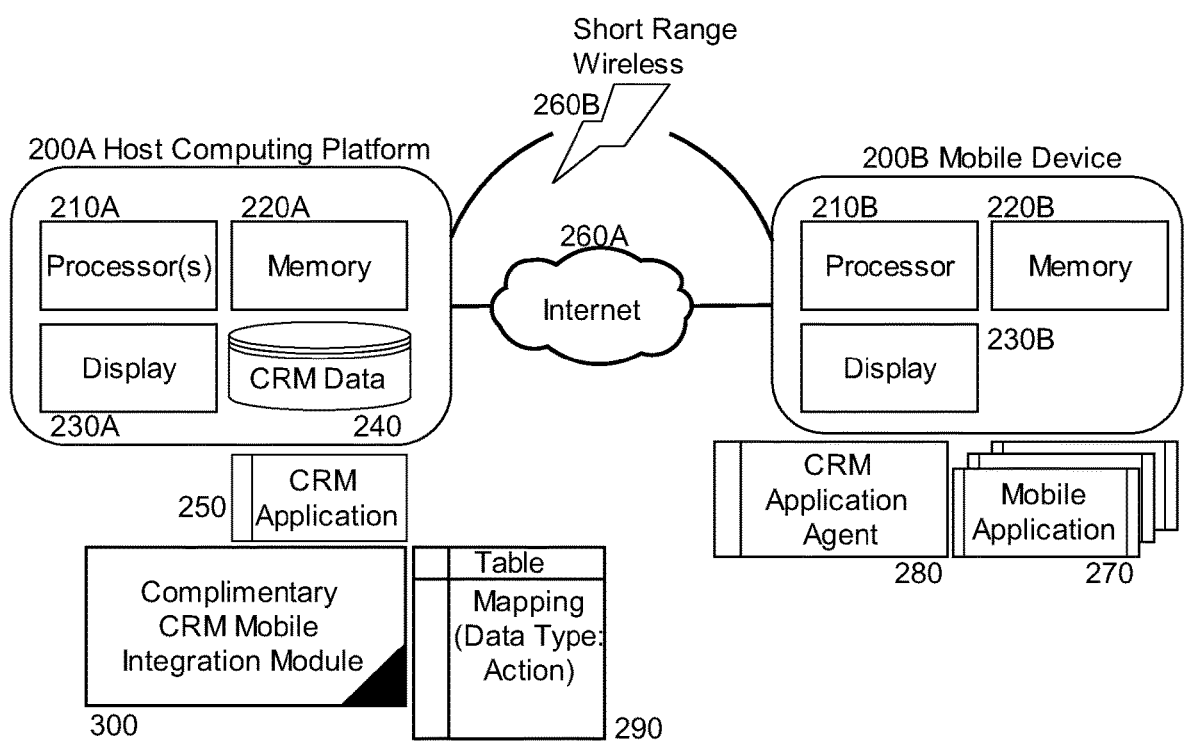
FIG. 2 is a schematic illustration of a CRM data processing system configured for complimentary CRM mobile integration; and, FIG. 3 is a flow chart illustrating a process for complimentary CRM mobile integration.

The process described in connection with FIG. 1 is implemented in a CRM data processing system. In yet further illustration, FIG. 2 schematically shows a CRM data processing system configured for complimentary CRM mobile integration. The system includes a host computing platform 200A that includes one or more computers, each with one or more processors 210A, memory 220A, a display 230A and fixed storage 240. (Only a single computer shown for ease of illustration) The system also include a mobile device 200B, such a smart phone. The mobile device 200B includes at least one processor 210B, memory 220B and a display 230B and supports the execution of several different mobile applications 270, including a phone dialer application, a messaging application, a navigation application and a social media application.

A CRM application 250 executes in the memory 220A of the host computing platform 200A. As well, a CRM application agent 280 executes in the memory 220B of the mobile device 200B. The CRM application agent 280 provides a communicative interface to the CRM application 250 over computer communications network 260A, or by way of short range wireless communications link 260B, for instance a Bluetooth or near field communications (NFC) link, and permit communications therebetween. In this regard, the CRM application agent 280 may receive directives forwarded by the CRM application 250 and more particularly, from Complimentary CRM Mobile Integration Module 300 coupled to the CRM application 250.

The Complimentary CRM Mobile Integration Module 300 includes program code that when executing in the memory 220A of the host computing platform 200A is enabled to receive a request for data in the CRM application 250 from an end user. To the extent that the end user issuing the request for data is known by the Complimentary CRM Mobile Integration Module 300 to simultaneously use mobile device 200B (as reported by the CRM application agent 280), the program code of the Complimentary CRM Mobile Integration Module 300 determines a type of data requested by the end user in the CRM application 250 and consults table 290 for a mapped action. Of note, while the table 290 is shown to be stored in the 200A host computing platform, it will be recognized that table 290 also may be stored in the mobile device 200B and consulted in the mobile device 200B by the Complimentary CRM Mobile Integration Module 300 through an interface provided by the CRM application agent 280.

Figure 3:
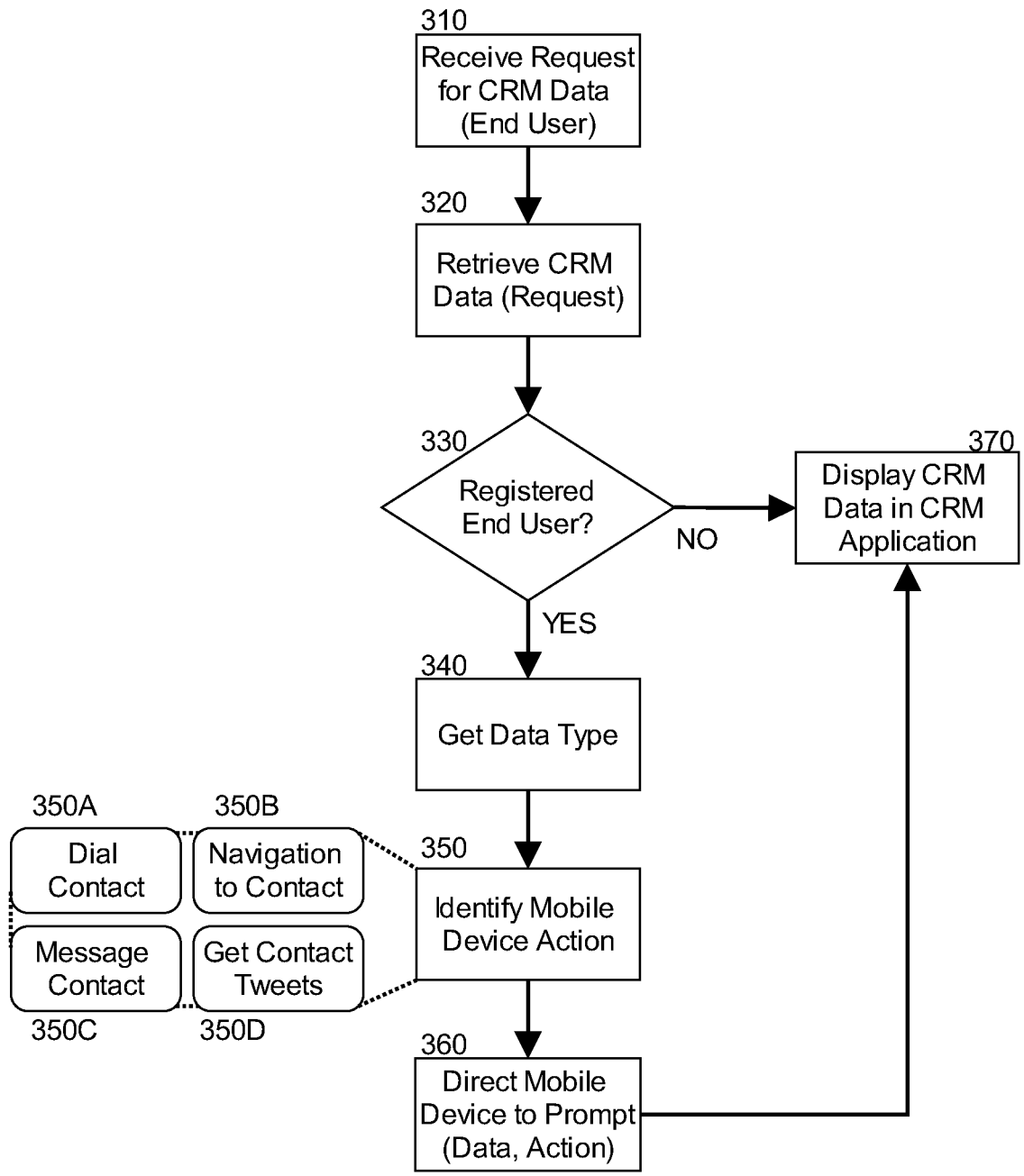

Once the program code of the CRM Mobile Integration Module 300 maps the data type of the request to an action for the mobile device 200B, the program code of the CRM Mobile Integration Module 300 directs the CRM application agent 280 to display a prompt in the display 230B of the mobile device suggesting the action in connection with the data to the end user. In more particular illustration of the operation of the program code of the Complimentary CRM Mobile Integration Module 300, FIG. 3 is a flow chart illustrating a process for complimentary CRM mobile integration.

Beginning in block 310, a request for CRM data from an end user is received in a CRM application executing in the memory of a host computing platform. In block 320, CRM data that is responsive to the request is retrieved into the memory from fixed storage. In decision block 330, it is determined whether or not the end user is registered for complimentary CRM mobile integration based upon the simultaneous utilization of a mobile device and the CRM application. If so, in block 340 a type of the data requested is determined. In block 350, a mobile device action mapping to the type is determined, for instance dial contact 350A, navigate to contact 350B, message contact 350C or retrieve social media postings of the contact 350D. Thereafter, in block 360 the mobile device is directed to display a prompt in the mobile device recommending completion of the mapped action. Finally, in block 370 the retrieved CRM data is displayed in a display of the host computing platform in connection with the CRM application.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

1. A method for complimentary customer relationship management (CRM) mobile integration, the method comprising:
   executing a CRM application in memory of a host computing platform;
   processing a data request in the CRM application from an end user by retrieving contact information for a customer associated with the request;
   determining whether or not the end user is registered for complimentary CRM mobile integration based upon a simultaneous utilization of a mobile device of the end user and the CRM application; and,
   on condition that the end user is not registered for complimentary CRM mobile integration, displaying the contact information in a user interface in the CRM application, but otherwise on condition that the end user is registered for complimentary CRM mobile integration, not only displaying the contact information in the user interface to the CRM application, but also establishing a wireless communications link between the CRM application of the host computing platform and a CRM application agent of the mobile device of the end user comprising a smart phone;
   identifying in the CRM application a type of data requested by the data request and performing a table lookup in a table with the identified type of data, the table lookup producing an action to be performed in the smart phone in connection with the customer of the display screen, the action comprising initiating a phone call to the customer at a telephone number from the contact information in the CRM application; and,
   transmitting to the CRM application agent of the smart phone from the CRM application of the host computing platform over the wireless communications link, a directive to display a prompt recommending the action to be performed by the end user in the smart phone including dialing the telephone number in the smart phone.

2. The method of claim 1, wherein the table is stored in memory of the mobile device.

3. The method of claim 1, wherein the table is stored in the memory of the host computing platform.

4. A customer relationship management (CRM) data processing system configured for complimentary CRM mobile integration, the system comprising:
- a host computing platform comprising one or more computers, each with memory and at least one processor;
- a CRM application executing in the memory of the host computing platform; and,
- a complimentary CRM mobile integration module coupled to the CRM application, the module comprising program code enabled upon execution in the host computing platform to perform:
- executing a CRM application in memory of a host computing platform;
- processing a data request in the CRM application from an end user by retrieving contact information for a customer associated with the request;
- determining whether or not the end user is registered for complimentary CRM mobile integration based upon a simultaneous utilization of a mobile device of the end user and the CRM application; and,
- on condition that the end user is not registered for complimentary CRM mobile integration, displaying the contact information in a user interface in the CRM application, but otherwise on condition that the end user is registered for complimentary CRM mobile integration, not only displaying the contact information in the user interface to the CRM application, but also establishing a wireless communications link between the CRM application of the host computing platform and a CRM application agent of the mobile device of the end user comprising a smart phone;
- identifying in the CRM application a type of data requested by the data request and performing a table lookup in a table with the identified type of data, the table lookup producing an action to be performed in the smart phone in connection with the customer of the display screen, the action comprising initiating a phone call to the customer at a telephone number from the contact information in the CRM application; and,
- transmitting to the CRM application agent of the smart phone from the CRM application of the host computing platform over the wireless communications link, a directive to display a prompt recommending the action to be performed by the end user in the smart phone including dialing the telephone number in the smart phone.

5. The system of claim 4, wherein the table is stored in memory of the mobile device.

6. The system of claim 4, wherein the table is stored in the memory of the host computing platform.

7. A computer program product for complimentary customer relationship management (CRM) mobile integration, the computer program product comprising a non-transitory computer readable storage medium having program instructions embodied therewith, the program instructions executable by a device to cause the device to perform a method comprising:
- executing a CRM application in memory of a host computing platform;
- processing a data request in the CRM application from an end user by retrieving contact information for a customer associated with the request;
- determining whether or not the end user is registered for complimentary CRM mobile integration based upon a simultaneous utilization of a mobile device of the end user and the CRM application; and,
- on condition that the end user is not registered for complimentary CRM mobile integration, displaying the contact information in a user interface in the CRM application, but otherwise on condition that the end user is registered for complimentary CRM mobile integration, not only displaying the contact information in the user interface to the CRM application, but also establishing a wireless communications link between the CRM application of the host computing platform and a CRM application agent of the mobile device of the end user comprising a smart phone;
- identifying in the CRM application a type of data requested by the data request and performing a table lookup in a table with the identified type of data, the table lookup producing an action to be performed in the smart phone in connection with the customer of the display screen, the action comprising initiating a phone call to the customer at a telephone number from the contact information in the CRM application; and,
- transmitting to the CRM application agent of the smart phone from the CRM application of the host computing platform over the wireless communications link, a directive to display a prompt recommending the action to be performed by the end user in the smart phone including dialing the telephone number in the smart phone.

8. The computer program product of claim 7, wherein the table is stored in memory of the mobile device.

9. The computer program product of claim 7, wherein the table is stored in the memory of the host computing platform.

* * * * *